Dec. 12, 1950     R. F. JAMES     2,533,732
FOOD TREATING AND STORING REFRIGERATOR AND METHOD
Filed Jan. 28, 1938     4 Sheets-Sheet 1

WITNESSES:

INVENTOR
ROBERT F. JAMES.
BY
ATTORNEY

Dec. 12, 1950 R. F. JAMES 2,533,732
FOOD TREATING AND STORING REFRIGERATOR AND METHOD
Filed Jan. 28, 1938 4 Sheets-Sheet 2

WITNESSES:

INVENTOR
ROBERT F. JAMES
BY
ATTORNEY

Dec. 12, 1950     R. F. JAMES     2,533,732
FOOD TREATING AND STORING REFRIGERATOR AND METHOD
Filed Jan. 28, 1938     4 Sheets-Sheet 3

INVENTOR
R. F. JAMES
ATTORNEY

Dec. 12, 1950   R. F. JAMES   2,533,732
FOOD TREATING AND STORING REFRIGERATOR AND METHOD
Filed Jan. 28, 1938   4 Sheets-Sheet 4

INVENTOR
R. F. JAMES.
BY J. W. Greenbowe
ATTORNEY

Patented Dec. 12, 1950

2,533,732

UNITED STATES PATENT OFFICE 2,533,732

FOOD TREATING AND STORING REFRIGERATOR AND METHOD

Robert F. James, Mahwah, N. J., assignor to Westinghouse Electric Corporation, East Pittsburgh, Pa., a corporation of Pennsylvania Application January 28, 1938, Serial No. 187,527

9 Claims. (Cl. 62—4)

This invention relates to refrigeration apparatus for the treatment and/or storage of foods and liquids, and includes the employment of ultra-violet light-generating means for sterilizing and improving the characteristics of such food, as by tenderizing and/or increasing or developing the vitamin content.

It is an object of my invention to provide a refrigerator cabinet wherein two separate compartments may be maintained at different refrigerating temperatures for preserving and treating various kinds of foods and liquids.

It is another object of my invention to operate a refrigerator cabinet with one compartment at a relatively high refrigerating temperature to conserve power and to retard dehydration of the foodstuffs contained therein; but to effectively preserve and treat the foodstuffs by utilizing an electro-magnetic radiation generating means such as an ultra-violet radiating device which has a marked bactericidal and/or therapeutic effect on the foodstuffs and air in the high temperature compartment, and which generates but small amounts of heat.

It is a further object of my invention to provide, in both the high and low temperature compartments, electromagnetic radiation generating devices such as ultra-violet devices which generate radiations having marked bactericidal and/or therapeutic effects, and which generate but small amounts of heat.

It is a still further object of my invention to provide a semi-porous wall member between compartments of different temperatures in a refrigerator cabinet, which is of such a material that food odors are effectively absorbed, and which is preferably easily renewable.

It is another object of my invention to provide a two-temperature refrigerator wherein a porous odor-absorbing wall member is provided between the compartments of different temperatures, the cooling element is disposed in the colder compartment, and the amount of refrigerated air which passes through the porous wall member is of such predetermined amount and temperature that a definite temperature is maintained in the warmer compartment.

It is still another object of my invention to provide a refrigerator wherein liquids and organic substances such as foodstuffs are treated by one or more ultra-violet radiating devices in a manner to effect preservation and purification thereof, and to ensure the destruction of microorganisms, or to arrest or prevent their development and action, while at the same time maintaining or increasing the vitamins and other desirable characteristics of the liquids and organic substances, so that their nutritional value and flavor are not impaired, but may be improved.

It is yet a further object of my invention to provide a refrigerator cabinet with means for producing ultra-violet radiation, so that the refrigerator may be operated at a higher temperature than at present considered safe, and wherein the foods and liquids are safely preserved because of the ultra-violet radiation, whereby the total power used by the refrigerator and the ultra-violet radiating means is less than normally used by the refrigerator alone in maintaining the lower temperature now considered necessary for safe food preservation.

It is a further object of my invention to provide a refrigerator cabinet with ultra-violet radiating means which produce but little ozone, whereby the cabinet may be substantially sealed from the atmosphere without danger of such ozone affecting foodstuffs, whereby heat load imposed if necessary to ventilate the cabinet is not present, and the power consumed by the refrigerating apparatus is only that necessary to take care of normal heat load of the cabinet and the small heat load of the ultra-violet radiating means.

It is another object of my invention to prevent undue temperature rise in the refrigerator cabinet due to food treatment by the utilization of an ultra-violet radiating device of the type which operates only slightly above ambient temperature.

It is a further object of my invention to provide a refrigerator cabinet with a device for producing ultra-violet radiation which generates very little heat, so that the refrigerator may be operated at a higher temperature than at present considered safe, and wherein the foods and liquids will be safely preserved because of the ultra-violet radiation, whereby the total power used to cool the refrigerator, to absorb the heat generated by the device and to operate the ultra-violet radiating device, is less than normally used by the refrigerator alone in maintaining the lower temperature now considered necessary for safety.

It is a still further object of my invention to so dispose an ultra-violet radiating device in a refrigerator cabinet that direct radiation developed by the device penetrates to all parts of the refrigerator cabinet with sufficient intensity to preserve and protect the liquids and organic substances therein, during or in excess of their normal storage period.

It is another object of my invention to provide a domestic refrigerator cabinet in which ultra-violet radiating devices are disposed to treat liquids and organic substances so that large areas of the devices are exposed to the air circulated in the refrigerator, which air when treated by the radiation assists the direct radiation from the devices in treating and preserving the contents of the refrigerator.

It is still another object of my invention to prevent breakage of the ultra-violet radiating devices which are disposed in a refrigerator cabinet for reducing odors and effecting treatment of liquids and organic substances.

These and other objects are effected by my invention as will be apparent from the following description and claims taken in accordance with the accompanying drawings, forming a part of this application, in which:

Figure 1:
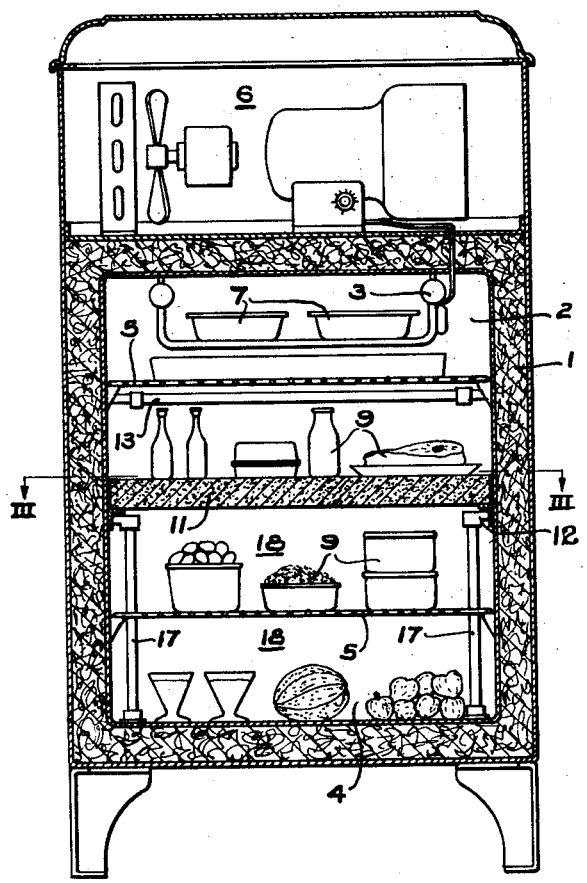
Fig. 1 is a view of a refrigerator cabinet, partly in section constructed in accordance with my invention.

Heretofore, it has been impractical to place an ultra-violet radiating device in a refrigerator which would develop radiation effective to treat and preserve liquids and organic substances because the devices operated at a high wattage and consequently placed too much load on the refrigerating apparatus to be economically practical. In addition, most ultra-violet radiating devices which develop desirable radiation for treating and preserving liquids and organic substances, also produce ozone in excessive amounts, which attacks some parts of a refrigerator cabinet and also breaks down some organic substances, such as, for example, fatty acids and which has, therefore, a deleterious effect on liquids and organic substances containing such fatty acids.

In my application, Serial No. 532,655, filed April 24, 1931, now replaced by continuation-in-part, Serial No. 734,620, filed July 11, 1934, now Patent No. 2,258,765, dated October 14, 1941, and assigned to the Westinghouse Electric & Manufacturing Company, there is disclosed and claimed an electric discharge device or electro-magnetic generator capable of producing ultra-violet radiation without the production of a harmful amount of ozone or a substantial amount of heat radiation. This device is described generally as comprising an evacuated container or envelope formed at least partly of a material, such as Corex glass, capable of transmitting ultra-violet radiation down to 2500 A. U. and absorbing the short rays therebelow, a gas within the container, and means for impressing a voltage on the gas sufficient to ionize the same and cause radiation of a substantially higher frequency than the visible spectrum. The gases preferably utilized in ultra-violet radiating device are neon, argon, and mercury vapor although any of the rare gases, including helium, krypton and xenon, or any mixture thereof, may be substituted for the neon and argon. The voltage drop across the tube during operation may be, for example, 500 volts. A current limiting transformer capable of starting voltage of 2000 volts is preferably utilized.

The pressure of the gas in the tube may be, for example, approximately 8 millimeters of mercury, absolute, at room temperature. A current of, for example, less than 25 milliamperes is passed through the gas. It has been found that the tube in operation assumes the temperature of the medium in which it is placed or it may, for example, operate at between 5 and 10° F. above the temperature of the medium. Containers composed of boro-silicate glass free from iron, such as that commercially known as "Corex D," are preferably used.

By properly proportioning the interrelationships of voltage, current, pressures, and temperatures at which the tube operates, and the glass thereof, as set forth, for example, hereinbefore, the discharge device produces ultra-violet radiation largely in the 2500 A. U.–3100 A. U. band. Somewhat less than 40% of the radiation is in the region of roughly, the 2530–2540 A. U. band, which is the very intense mercury band.

The ultra-violet radiations, particularly those from the mercury lines lying within the 2530–2540 Angstrom unit band so emitted by this device, are materially less intense than those emitted by any of the more common methods now in use, such as the quartz mercury vapor light or the electric arc, and unusual results are, therefore, obtained. Experimental evidence obtained with this source of ultra-violet lights shows that it generates but little heat because the efficiency of the tube is high for generating radiation in the 2530–2540 Angstrom unit band and therefore only small quantities of the power input is converted into heat energy. The source of ultra-violet light also has a decided bactericidal effect on all bacteria except those which depend upon light for their metabolic processes, while at the same time it has no appreciable deleterious effect on the host of the bacteria, either vegetable or animal. Nor does the radiation produce erythema or conjunctivitis in humans. Experimental evidence obtained with this device also shows that it has the property of reducing odors and increasing the vitamin D content of various foodstuffs such as milk, vegetable oils, butter, etc.

By using a suitable container such as one composed of boro-silicate glass free from iron and of proper thickness to filter out radiations materially below 2500 Angstrom units, the source may be placed in refrigerators to sterilize the air, foodstuffs, and liquids, and to increase the vitamin D content of said foods and liquids, with the production of but little ozone so that the chemical state of the foods and liquids is not deleteriously changed, and objectionable tastes or odors in the foods are prevented, thereby allowing the food storage compartment to be sealed from the atmosphere outside the box. Refrigerating load due to ventilating the box, which ventilation has heretofore been considered necessary, is, therefore, not present when this type of ultra-violet radiating device is used. In addition, because of its efficiency and because the voltage gradient between the electrodes is depended upon to ionize the gas, whereby devices such as heated electrodes are unnecessary, but small wattage is consumed by the device and undue temperature rise in the refrigerator is prevented.

Figure 2:
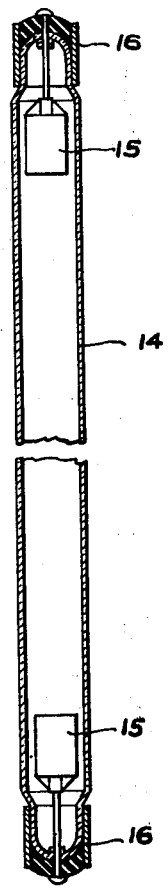
Fig. 2 is a sectional view of an ultra-violet radiating device preferably used in practicing my invention.
Figure 3:
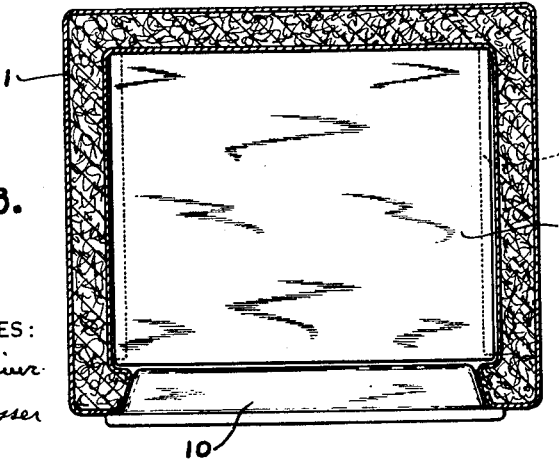
Fig. 3 is a sectional view of the cabinet taken on line III—III of Fig. 1, in the direction of the arrows.

Referring specifically to Figs. 1, 2 and 3 of the drawings for a detailed description of one embodiment of my invention, numeral 1 designates generally a refrigerator cabinet embodying a low temperature compartment 2 having cooling element or evaporator 3 therein suitable for storing articles which are not easily dehydrated, such as bottled or packaged foods. A second compartment 4 is provided in the refrigerator cabinet 1 which compartment 4 is maintained at a relatively high temperature for the storage of foods which are dehydrated and spoiled if stored in the usual low temperature food storage compartment of a refrigerator cabinet. Shelves 5, preferably of open type to permit air circulation, are disposed in the compartments 2 and 4 for supporting articles to be stored in the cabinet 1. A closure member 10 normally seals the compartments 2 and 4.

Refrigerating apparatus of the compression type is shown diagrammatically at 6 for circulating refrigerant through the evaporator 3 to congeal liquids in ice pans 7 and to cool the cabinet 1 and foodstuffs 9 therein. A temperature control device of any well known type is provided for maintaining the cooling unit at a predetermined temperature. A partition 11, formed of a semi-porous material such as, for example, a carbon compound, composition or mixture, divides the compartments 2 and 4. Air cooled by the evaporator 3 cools the compartment 2 and circulates slowly through the porous partition 11 to cool the compartment 4. Because of the restricted circulation of refrigerated air into the compartment 4 normally containing dehydratable food, and the heat leakage into the compartment 4 through the walls of the cabinet 1, a warmer temperature and a more humid atmosphere is maintained in the compartment 4. By maintaining a predetermined temperature in the colder compartment 2, and by selecting the size of the partition 11, the temperature of the warmer compartment 4 is also controlled.

By forming the partition 11 of a material such as a carbon compound, the food odors in the air in circulating through the partition are absorbed. The partition 11 is preferably renewable as the absorbing qualities of carbon decrease in time. Angle irons 12, therefore, are provided for supporting the partition 11 which may be cocked and withdrawn from the cabinet 1 incident to renewal, or withdrawal in case it is desired to convert the refrigerator into one having but one food compartment.

Figure 4:
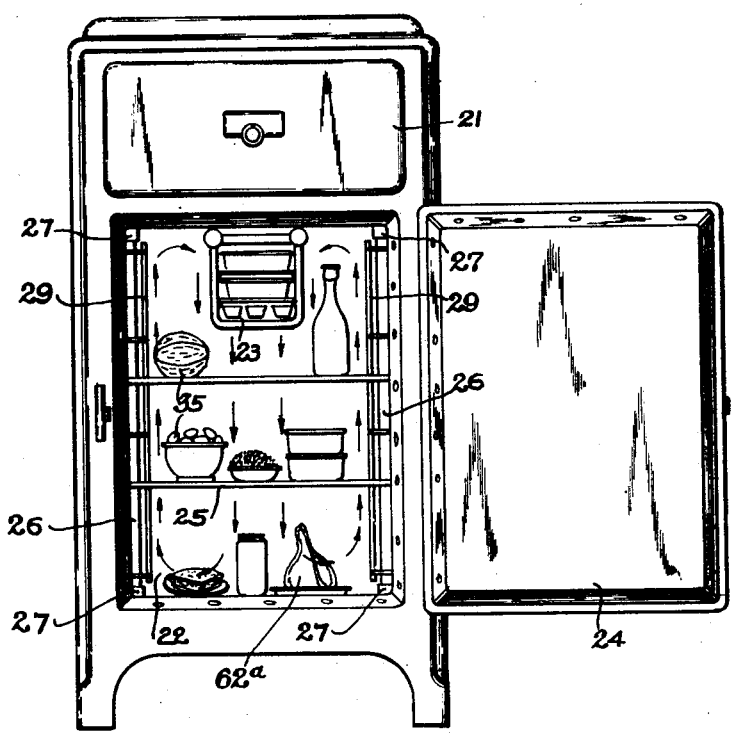
Fig. 4 is a front view of another form of refrigerator cabinet containing ultra-violet radiating devices arranged therein in accordance with my invention.
Figure 5:
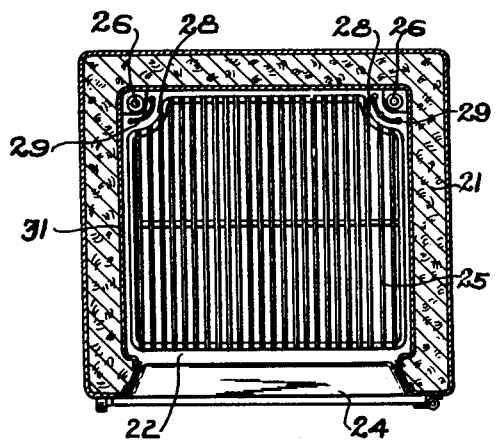
Fig. 5 is a horizontal sectional view of the refrigerator cabinet of Fig. 4 showing one embodiment of my invention.

An ultra-violet radiating device 13, which may be single tubed and with electrodes spaced far apart or close together, as illustrated respectively in Figures 1 and 2 of said parent case, or doubled as illustrated in Figures 3, 4 and 5 of said case, is disposed in the colder compartment 2 for treating the contents 9 thereof. The ultra-violet device is preferably of the type described and claimed in my aforementioned copending application and comprises a container 14 (Fig. 2) of ultra-violet transmitting glass, a pair of electrodes 15 formed of metal such as iron or aluminum, and a pair of terminals 16 which are connected to a suitable source of power (not shown).

The ultra-violet radiating device 13 may be disposed horizontally in the colder compartment 2 and sterilizes and preserves the contents 9 thereof by direct radiation and by sterilizing and deodorizing the air circulating in the compartment 2, some of the radiation passing through the open shelf to contact foods which may be stored on partition 11 if said device 13 is disposed above the shelf 5.

Ultra-violet radiating devices 17 are disposed in the warmer compartment 4 vertically thereof to radiate into sub-compartments 18 formed by shelf 5 onto the foodstuffs 9. The ultra-violet radiating devices 17 are similar to the one described which is disposed in the colder compartment 2.

By disposing an ultra-violet radiating device, such as that described, in the colder compartment 2, the foodstuffs therein may be kept for longer periods of time because of sterilization, than if preserved by a low temperature only, the necessity of freezing ice in the pans 7 making the low temperature desirable. In addition, the cold compartment is usually used for storing butter, beverages, such as milk, etc., which foods, if placed in ultra-violet transmitting containers, or exposed directly to the ultra-violet radiation, may be therapeutically treated by the ultra-violet radiation to add vitamin D thereto. Since the ultra-violet radiating device 13 consumes but little power, and generates but little heat and ozone, the heat load on the refrigeration apparatus 6 is not materially raised and the compartment 2 need not be ventilated to release ozone and other odors, thus preventing any head load from this source being imposed on the refrigerating apparatus 6. Such ventilation has heretofore been necessary in refrigerators equipped with ultra-violet devices because the heretofore known devices produced excessive amounts of ozone with the desirable radiation.

By disposing the ultra-violet devices 13 in compartment 4, the compartment may be maintained at a temperature substantially above that now considered safe for preserving foods. Dehydration of the foods is, therefore, inhibited, and, consequently, the foods are kept in good physical condition for long periods of time. The use of ultra-violet radiation to prevent the growth of bacteria, molds, etc., further prevents food spoilage and consequent odors. In addition, less power is consumed by operating the compartment 4 at a high temperature than if operated at a temperature normally considered safe, even though the radiating devices 13 consume some power and impose a slight heat load on the refrigerating apparatus 6.

The same advantages of utilizing an ultra-violet device such as that described in connection with the cold compartment 2 are apparent in the compartment 4 in that, for example, it may be normally sealed because very little ozone is generated by the devices 17.

If, for any reason, refrigeration fails and the temperatures of the compartments rise, the pressure of the mercury vapor in the tubes also rises and the intensity of the ultra-violet radiation increases, whereby the food preserving properties of the tubes increase. Thus, foods are safely preserved for a substantial time at a time when most necessary; namely, when refrigeration fails.

Because of the fact that the character of the ultra-violet generating devices or lamps, 13 or 17 as the case may be, is important, in that in order to get all the desirable results which I contemplate it is not sufficient to merely use any kind of an ultra-violet generating lamp, I will now describe a preferred form of lamp which I propose to employ, so that it will not be necessary to refer back to my copending application Serial No. 734,620, previously referred to.

A preferred embodiment of my ultra-violet radiation generating lamp comprises a container or envelope 14 of glass which transmits radiations having wave lengths above 2500 A. U., but which is absorbent to nearly all radiations below that wave length. By absorbing the short ultra-violet rays, or those below 2500 A. U., the generation of an appreciable amount of ozone is avoided whereby spoilage or undesired taste alteration, due to chemical change or ozone contamination, is obviated. A boro-silicate glass free from iron such as that commercially known as Corning No. 972, High Transmission Ultra-Violet glass, which is a form of Corex glass, is suitable. A special glass, designated as Corex D, has also been used successfully for the purpose.

Figures 7, 8:
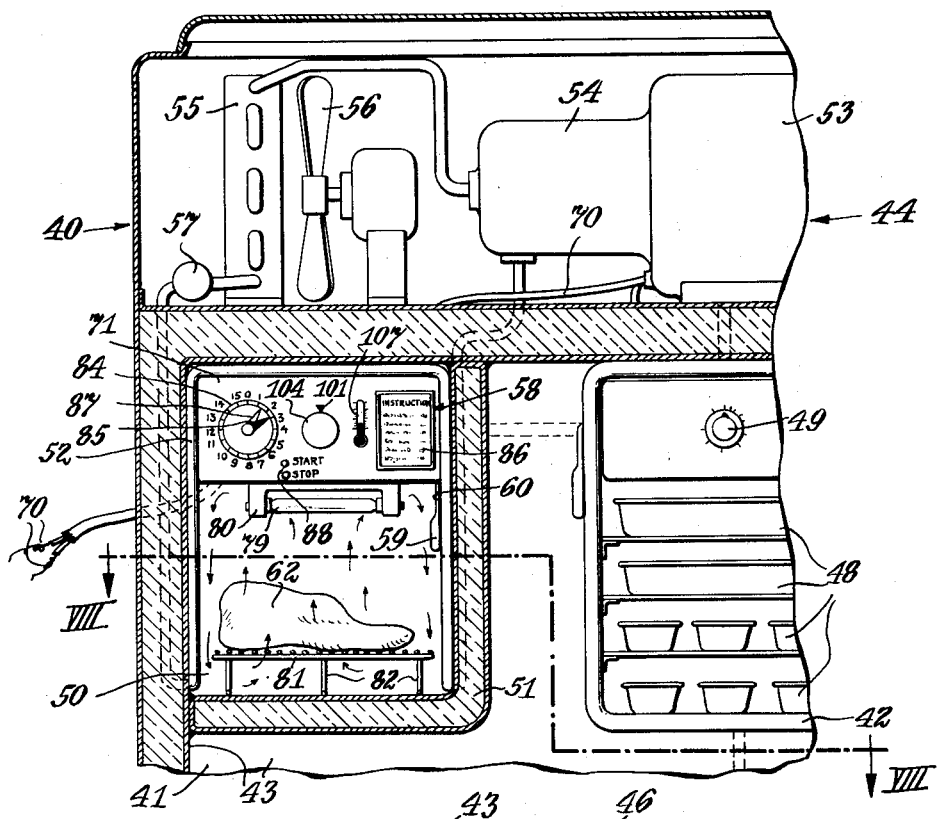
Fig. 7 is a vertical sectional view of a refrigerator cabinet involving a further embodiment of my invention.
Fig. 8 is a horizontal sectional view on the line VIII—VIII of Fig. 7, in the direction of the arrows.

In the envelope 14 are sealed a pair of main electrodes 15, one in each end. Said electrodes are preferably supported by leading-in conductors formed of material such as tungsten wire which are sealed through the envelope and project outside to form contact pieces. These electrodes may be generally cylindrical or tubular, constructed of a good conducting material as a metal such as iron, aluminum, or nickel, and the envelope is desirably elongated as illustrated in Fig. 8.

The envelope 14 encloses an ionizable medium which may consist of 60% neon and 40% argon admixed with mercury vapor, as mercury increases the intensity of ultra-violet radiation and particularly that part in the range between 2530 and 2540 A. U. However, any one of the rare gases of the group comprising helium, neon, argon, krypton, and xenon, or any mixture thereof, may replace the specified neon-argon mixture. The absolute pressure of the mixture at room temperature is desirably low; that is, about 8 millimeters.

When used to treat food for bacterial destruction, without detrimentally affecting such food, a potential is impressed across the electrodes and the source of energy controlled to minimize the generation of detrimental radiations, the current being adjusted, when the envelope has a length in accordance with the corresponding dimension of the refrigerating cabinet, an internal diameter of about 1.27 centimeters, and a wall thickness of about 1 millimeter, so that its density is low; that is, between about 10 and 40, or less than 40, milliamperes per square centimeter. A typical example of the current in such a tube, 46 centimeters long, is about 25 milliamperes, with a potential drop of about 500 volts. The transformer employed with such a tube, however, is desirably of the current limiting type and has the capacity of initially applying about 2000 volts in order to insure starting.

When so operated, the ultra-violet generator delivers radiations with a minimum proportion detrimental to food, on account of the generated radiations being filtered of undesirable components by the material of the envelope, whereby the radiations generated have a large proportion above 2500 A. U. or between 2500 and 2800 A. U. which are particularly effective for bactericidal and fungicidal purposes, while weak for producing undesirable taste and odor changes in food irradiated thereby.

The intensity of the radiations may be so controlled that those destructive to bacteria become effective in a time period less than that required for any detrimental radiations, not absorbed by the glass, to have a harmful effect. I may therefore utilize the bacterial radiations at the intensity produced for exposing the food in the refrigerator for a period of time only long enough to produce substantially complete surface sterilization, without causing any detrimental effect thereto or changing its chemical state to cause objectionable tastes and odors.

From the foregoing, it will be apparent that I have provided a refrigerator having two compartments maintained at different refrigerating temperatures and different humidities for storing different classes of foods, etc., and that I have provided ultra-violet radiating devices for reducing odors and treating and preserving the contents of the refrigerator of such a type that the contents are effectively treated and the load on the refrigerating mechanism or the total power used by the refrigerator is not increased. Furthermore, I have provided a novel two-temperature refrigerator cabinet in which food odors, etc., are effectively absorbed and wherein only one cooling element need be utilized.

Referring now specifically to the embodiment of my invention illustrated in Figs. 4 and 5 of the drawings, numeral 21 designates generally a refrigerator cabinet having a normally closed food storage compartment 22, wherein a cooling element or evaporator 23 causes thermosyphonic circulation of refrigerated air, as shown by the arrows in Fig. 4. Foodstuffs 35 are placed in the food storage compartment 22. A metal liner 31 forms the food storage compartment 22, and is preferably formed with a reflecting surface, such as polished stainless steel, for a purpose hereinafter described. Refrigerant for cooling the food compartment 22 is circulated through the cooling element 23 by a motor-compressor-condenser unit (not shown). An access door 24 is provided for the food storage compartment 22. Horizontal open-work shelves 25 are provided in the food storage compartment 22 for the reception of foodstuffs, liquids, et cetera, which are to be cooled and preserved.

Electro-magnetic generating or ultra-violet radiation devices 26, such as described and designated by the reference characters 13 and 17 of the first embodiment, are disposed in the food storage compartment 22, and are connected to terminals 27 which are supplied with potential from a suitable source. The devices 26 are disposed vertically in the food storage compartment 22 and at the rear corners thereof. The shelves 25 are cut away at 28 to provide space for the radiation devices 26. Metal guards 29 are disposed around the devices. The radiation from the devices is, therefore, projected directly onto the foodstuffs 35, while some of the radiation is reflected by the food compartment liner 31. The radiation is less interrupted by foodstuffs, through which it cannot pass, than if disposed at the top or bottom of the food storage compartment with the intention of projecting the radiation through the shelves on all the contents of the refrigerator.

Figure 6:
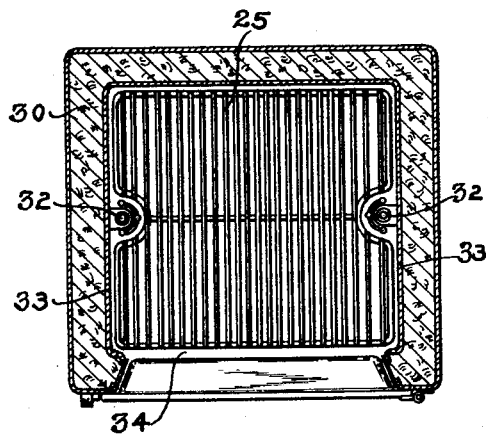
Fig. 6 is a horizontal sectional view of a refrigerator cabinet like that of Fig. 4, but showing a further embodiment of my invention.

Referring now to Fig. 6 for a disclosure of a further embodiment of my invention, I have shown a refrigerator cabinet 30 of the same construction as shown in Figs. 4 and 5. Ultra-violet radiation devices 32 are disposed adjacent the side walls 33 of a food storage compartment 34 and substantially spaced from the front and rear of the food storage compartment 34. The ultra-violet radiation devices 32, therefore, project more direct radiation onto the contents of the food compartment 34 than when placed in the corners of the food compartment and, therefore, are more effective to treat and preserve said contents.

By disposing the radiating devices in the food storage compartment in the manners shown and described, the radiation therefrom is projected between the shelves of the food storage compartment, whereby liquids and foodstuffs disposed on the shelves are subjected to direct radiation from ultra-violet devices. By utilizing a food compartment liner having reflecting surfaces, those rays which are not directly projected are efficiently reflected onto the contents of the refrigerator.

It will be apparent from the arrows shown in Fig. 4 that the convection currents of air circulate vertically over a maximum area of the radiation devices and are treated thereby, thus assisting the direct radiation of the device in treating and preserving the contents of the food storage compartment 22.

The refrigerator food storage compartment 22 may be operated at a temperature well above that now considered safe for the preservation of foodstuffs because the ultra-violet radiation produced by the device described prevents the growth of bacteria, molds, et cetera, and prevents food spoilage even at higher temperatures. The refrigerator food storage compartment 22 may therefore be operated at a temperature, for example, of 60° F. to 70° F., whereas the temperature which is considered as safe without such a device is approximately 50° F. The power consumed to absorb the heat load of the ultra-violet device and the power required to operate the device is considerably less than the additional amount of power required to operate the box at 50° rather than 60° F. particularly at higher room temperatures. There is, therefore, a distinct saving in power in operating the refrigerator while at the same time liquids and foodstuffs contained in the refrigerator are maintained in better condition.

If, by chance, the refrigerating mechanism fails, the pressure of the mercury vapor in the ultra-violet radiating device rises as the cabinet temperature rises, and the intensity of the 2530–2540 Angstrom unit radiation increases, thereby increasing the food preserving and deodorizing effect of the device at a time when it is very desirable.

Furthermore, the cabinet may be substantially sealed from the atmosphere because but little ozone is produced by the radiating devices whereby refrigerating load due to ventilation of the cabinet, which is necessary when ozone in larger amounts is produced, is not present.

From the foregoing, it will be apparent that I have provided a refrigerator wherein an ultra-violet radiating device may be utilized for treating and assisting in the preservation of liquids and/or organic substances without materially raising the temperature of the food storage compartment, and which device, as associated with other parts of the refrigerator, is extremely effective to properly treat and preserve the contents of a domestic refrigerator and reduce odors. The contents of the refrigerator are subjected to large amounts of direct radiation and also to reflected radiation and the circulating air in the refrigerator is highly activated to assist in the treatment and preservation of the contents. The beneficial results are obtained by the correct disposition of the novel ultra-violet radiating devices and their proper association with other features incorporated in the cabinet such as, for example, the reflecting food liner, as well as other parts of the refrigerator construction.

Furthermore, the amount of current consumed to maintain the refrigerator at a safe food-preserving temperature with the radiating device therein, to absorb the heat generated by the radiating device and to operate the radiating device, is less than normally consumed to maintain the refrigerator at a safe food-preserving temperature without such an ultra-violet radiating device.

Referring now to the embodiment of my invention illustrated in Figs. 7 and 8, the numeral 40 designates generally a refrigerator cabinet having a normally closed food storage compartment 41, wherein a cooling element or evaporator 42 causes thermo-syphonic circulation of refrigerated air, as in the previous embodiments. Foodstuffs, not shown, may be placed in the storage compartment, as heretofore. A metal liner 43 coats the inner surfaces of the walls and the top and bottom, defining the food storage compartment, and is preferably formed with a reflecting surface, as in the previous embodiments, in order to efficiently re-direct the radiant energy from the ultra-violet generators employed, for the purpose of accomplishing the greatest amount of sterilization.

Refrigerant for cooling the food compartment 41 may be circulated through the cooling element 42 by a motor compressor-condenser unit of conventional construction (not shown). An access door 45 is provided for the food storage compartment 41. Horizontal shelves, preferably of the grille or open type, only one of which is indicated at 46, are desirably provided for the food storage compartment, in order to hold foodstuffs, liquids, and the like which are to be cooled and preserved, and allow for air circulation.

Electro-magnetic generating or ultra-violet radiation devices 47, such as described and designated by the reference characters 13, 17, 26 and 32 in previous embodiments, are disposed in the food storage compartment 41 and supplied with electrical energy from a suitable source. The devices 47 may be disposed vertically in the food storage compartment, and at the rear corners thereof, intersecting the planes of the shelves as in the embodiment of Figs. 4 and 5, or adjacent the side walls and substantially spaced from the front and rear of the food storage compartment 41, as in the embodiment of Fig. 6, or alternatively said devices may be disposed horizontally, as the device 13 in the embodiment of Fig. 1, as may be desired for the sterilization of the foodstuffs.

If disposed vertically, such devices are desirably protected by metal guards, as in the embodiment of Figs. 4 and 5, and the radiation therefrom is then projected directly onto the food and other material in the compartment 41, while some of the radiation is reflected by the liner 43 so that an efficient irradiation of the foodstuffs is secured.

The cooling element or evaporator 42 may serve to support ice pans, or trays 48, for the purpose of freezing water or other liquids, as well as cooling the food compartment 41. A switch and controlling or adjusting knob 49 serves for determining the temperature of the cooling liquid, so that the desired temperature in the compartment may be maintained, regardless of outside temperature conditions.

In the present embodiment, I have shown a subcompartment 50 partitioned from the main food compartment 41 by insulating walls 51, which are preferably formed of such good insulating material that the cooling effect of heat transfer therethrough will not interfere with the maintenance of the temperature therein considerably higher than that in the main compartment 41. Said subcompartment 50, like the main compartment 41, contains an evaporator or cooling element 52 connected to refrigerating apparatus, such as that designated by the reference character 44, which may be entirely independent of that for refrigerating the main compartment 41. The apparatus preferably comprises a motor 53 driving a compressor 54, which pumps refrigerant gas under high pressure to a condenser 55, wherein said gas is cooled by a fan 56 and condensed. The condensed refrigerant is then conveyed to an expansion device 57 and thence to the evaporator 52 disposed in the supplemental food storage compartment 50, and after extracting heat therefrom, the refrigerant gas is then withdrawn by the compressor and the cycle repeated. The well known compressor-condenser-expander, refrigeration cycle is used, as is apparent from the above description and further detailed explanation thereof is not necessary.

In order to control the temperature of the evaporator, and thus the temperature of the food storage compartment 50, a control mechanism, generally designated as 58, is provided and, as shown in Fig. 7, comprises a bulb 59 filled with an expansible medium, disposed in contact with a surface of the evaporator 52, and connected by a small conduit 60 with an expansible bellows 61. (See Fig. 11.) The bulb 59, therefore, quickly responds to the evaporator temperature, as well as to the temperature of the air adjacent the evaporator, so that the expansible medium therein will act, when warm food material, such as a roast of meat 62, is placed in the subcompartment 50 between sides of the evaporator 52, or when the heat load in said subcompartment 50 reaches a predetermined value.

The bellows 61 is connected to a pivoted lever 63 and movement thereof is opposed by a spring 64. A snap-acting switch mechanism 65 is attached to the free end of the lever 63 and operates a movable contact 66 which cooperates with a stationary contact 67 to open and close the motor circuit through conductors 68 and 69, a suitable source of electrical power being provided through conductors 70. The entire control mechanism is preferably housed in a metal box 71 through which the conductors extend. The compressor will therefore be rendered active or inactive in accordance with the temperature and pressure of the expansible medium in the bulb 59, so that for constant ambient temperature a substantially constant mean temperature will be maintained at any given point in the food storage subcompartment 50.

It is desirable, however, to provide an adjustment for the temperature control mechanism, so that desired temperatures in the storage compartment may be obtained for different ambient temperatures which normally vary from 60 to 110° F., depending on the season and the location of the refrigerator. A temperature adjusting device is therefore provided and comprises a shaft 72 threaded into the metal control box 71 and provided with a cap 73 at its inner end which engages the spring 64. The shaft is also provided with a readily accessible adjusting knob 74 at its outer end.

Movement of the shaft 72 in a clockwise direction increases the spring bias so that the temperature at the evaporator must be higher to close the contacts 66, 67. Movement of the shaft 72 in a counterclockwise direction decreases the spring bias so that the temperature at the evaporator is lower for closing the contacts 66, 67. A lever 75 is pivoted at 76 to the box 71 and a connecting link 77 is provided between the levers 75 and 63. When the shaft 72 is turned sufficiently in a counterclockwise direction, the cap 73 engages the end of the lever 75 and may move it in a clockwise direction about the pivot 76, thus either moving the main lever 63 to closed circuit position or maintaining the contacts 66, 67 in closed position, so that the compressor 54 is operated regardless of the temperature of the storage compartment 50 and evaporator 52.

Figure 10:
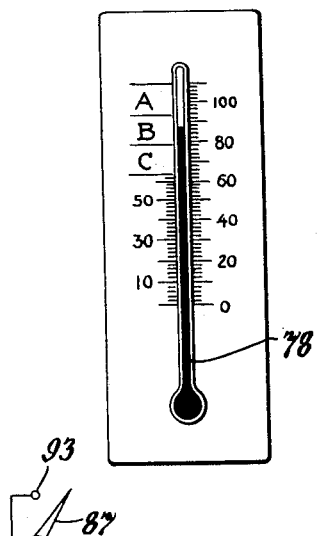
Fig. 10 is an enlarged view of a temperature indicating device provided with indicia correlated with indicia associated with the adjusting knob.

In practicing my invention, a thermometer 78 which records ambient temperatures, is preferably disposed on some part of the refrigerator cabinet 40, as on the door 45. The thermometer 78 may be provided with the usual temperature indicia in degrees Fahrenheit and is also preferably divided into Zones A, B and C, as shown in Fig. 10. Zone A includes, by way of example, temperatures between 94° F. and 110° F., Zone B includes temperatures between 79 and 94° F., and Zone C includes temperatures between 64 and 79° F. The adjusting knob 74 is desirably provided with several indicia such as an "Off" position, a "Tenderizing" position, one or more temperature indicating positions, and a "Preserving" position. The "Tenderizing" position maintains the temperature of the compartment between 55 and 60° F., in order to allow for rapid tenderization of the meat 62, or the holding of food products therein which do not need to be kept as cold as in the main compartment 41. It is obvious that when the evaporator is operated with the knob 74 in this position, there is no formation of frost and, therefore, if changed from a colder position any frost previously formed thereon will melt off or defrost. The colder or "Preserving" position is such that the temperature in the compartment will be maintained below 45° F., as between 40 and 45° F., where meat which has been tenderized or aged may be kept for relatively long periods of time without further appreciable change.

Figure 9:
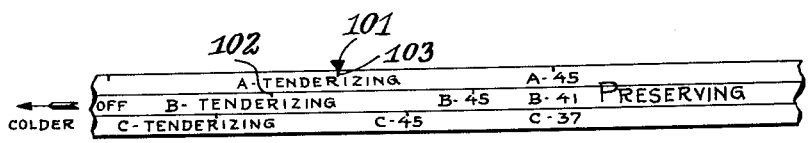
Fig. 9 is a developed view of the edge portion of the temperature adjusting knob.
Figure 11:
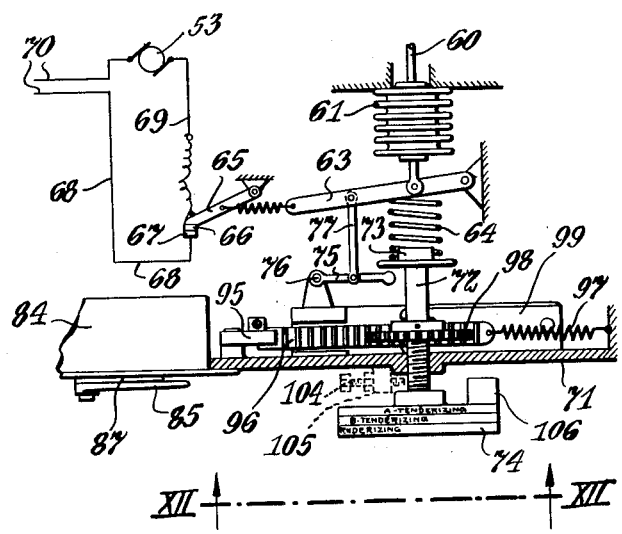
Fig. 11 is a diagrammatic illustration of temperature control mechanism for a motor-driven compression type of refrigeration system.
Figure 12:
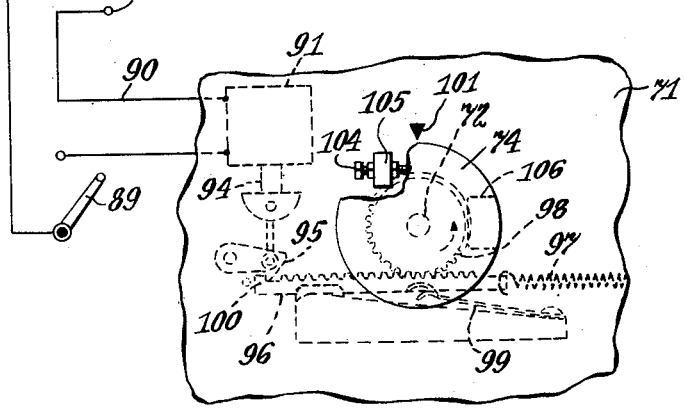
Fig. 12 is a diagrammatic representation of time control mechanism which may be used with the mechanism of Fig. 11, the adjusting knob being shown on the line XII—XII of Fig. 11 in the direction of the arrows.

The knob has its edge marked as indicated in Figs. 9 and 11, so that the adjustment of the compressor will vary in accordance with the ambient temperature, whereby greater refrigerating effect will be supplied to the compartment 50 during times when the ambient temperature is high.

It is also desirable to have clock mechanism associated with the knob 74, so that when the compartment 50 has been held at a tenderizing temperature of from 55 to 60° F. for a length of time sufficient to tenderize the meat, in accordance with the teachings of my copending Patents No. 2,169,081, dated August 8, 1939, and No. 2,192,348, dated March 5, 1940, both owned by the assignee of the present application, said knob will be automatically returned to "Preserving" position, thereby initiating the bringing back of the temperature to between 40 and 45° F., or one corresponding with the temperature of the main refrigerating compartment 41, and preventing the meat from becoming over-tenderized due to holding it too long at a relatively high temperature.

In order to control the tenderizing time, or time for which the compartment 50 is held at a relatively high temperature prior to being reduced to normal refrigerating temperature, I provide a clock 84 which may have an adjustable, normally stationary hand 85, set in accordance with instruction sheet 86 for a given period of time such as, for example, three days, at which relatively high temperature the meat 62 is to be held for tenderization. Said clock also has a moving hand 87, which when the meat 62 is placed in the compartment 50, is set to register with the hand 85. Pushing the "Starting" button 88 to close a switch 89, results in starting the clock, the hand 87 of which moves in a direction counterclockwise toward zero position.

When the hand 87 of the clock reaches zero position, it closes the circuit 90, connecting solenoid 91 to a source of power 92, as by engaging electrical contact 93, resulting in movement, by the armature 94, releasing pawl 95 from the rack bar 96, allowing the spring 97 to move the adjusting knob 74 from "Tenderizing" position to "Preserving" position, by means of engagement of the spur gear 98 on the shaft 72 with the rack bar 96 pressed thereagainst by means of leaf spring 99. It will be seen that on account of the resilient engagement between the rack bar 96 and the spur gear 98, an adjustment may be made for the ambient temperature, so that when said temperature is hot, for example, the tenderizing may be effected on the "A" scale; that is, with a greater amount of refrigerating effect, than when the ambient temperature is cool. In order to change, for example, from "A" to "B" tenderizing conditions, the rack is disengaged from the spur gear 98 so that when the pawl 95 engages the shoulder 100 on the rack bar 96 and said rack bar is in engagement with the spur gear 98, the pointer 101 on the cabinet 71, registers with the "B" tenderizing mark 102 rather than with the "A" tenderizing mark 103.

In order to allow for adjustment of the point to which the spring brings the control knob 74 when the solenoid 91 releases the rack bar 96, an adjusting screw 104 is desirably provided in a stop 105, so that when the rack bar 96 is released it returns the adjusting knob 74 only until the stop lug 106 thereon engages the adjusting screw 104 in the stop 105, whereby the desired preserving temperature for the meat after tenderization is secured, making allowance for variations in the ambient temperature. As an example, it will be seen that when the ambient temperature is high, it will be desired to return the knob 74 to a point where the desired holding temperature on scale "A" registers with the pointer 101 which will require a setting of the adjusting screw 104 in a retracted position. On the other hand, when the ambient temperature is low, the adjusting screw 104 may be extended so as to stop the return of the adjusting knob 74 when the desired preserving temperature on the "B" or "C" scale, as the case may be, registers with the pointer 101.

Although I have shown a refrigerator in which an insulated compartment 50 is provided, which compartment may be kept at a different temperature from the main compartment entirely independent of the temperature of the main compartment, it will be understood that, if desired, I may provide no cooling effect in the compartment 50 other than that obtained by heat transfer through the partition walls 51 and, under those circumstances, it is found that a relatively moderate temperature is provided in the compartment 50 suitable for meat tenderization. In any event, it is desirable to have a thermometer 107 on the face of the control box 71, so that the clock hand 87 will be set for the desired tenderizing time in accordance with the instructions, or, if no independent cooling means are provided in the compartment 50, so that the meat will be left in said tenderizing compartment for the proper interval of time in accordance with said instructions, which follow the teachings of my Patents Nos. 2,169,081 and 2,192,348, previously referred to.

As a further alternative, I may tenderize meat in the relatively warm compartment 4 in my two-temperature refrigerator 1, illustrated in Figs. 1, 2, and 3, and after said meat is sufficiently tenderized, transfer it to the low-temperature compartment 2 where it is maintained at the desired preserving temperature until used.

As a still further alternative, I may make the lower shelf 25 of the refrigerator 21, as shown in Fig. 4, of unperforated material, like the partition 11 in Fig. 1, so that the piece of meat 62ᵃ in the lower part of the said refrigerator may become tenderized in a given relatively short length of time, in accordance with instructions, while protected from spoilage by the radiations from the lower portions of the vertically extending ultra-violet generators, 26 or 32 as the case may be. After tenderizing to the desired degree, said meat 62ᵃ may be removed from the lower portion of the refrigerator and inserted in the upper portion where it will be maintained at a lower or preserving temperature until used, while still protected from spoilage by the radiations from the ultra-violet lamps.

In order to prevent bacterial spoilage, correspondingly reduce odors, and at the same time stimulate or activate the enzymes to produce the desired tenderization, I provide an ultra-violet generator 79 which need only be small or short, as illustrated in Fig. 7, but which otherwise desirably corresponds with the generators 13, 17, 26, 32, and 47, previously described. This generator 79 is desirably mounted directly in the top of the compartment 50 beneath the control box 58, suitable holding and contact means 80 being provided. In order to provide for the sterilized air reaching all parts of the meat 62, the same is desirably supported on a grille or open platform 81, raised from the bottom of the tenderizing compartment 50 by legs 82. During operation, air currents flow as indicated by the arrows; that is, down along the cold sides of the evaporator 52 and up from the meat to the ultra-violet lamp 79. The tenderizing compartment 50 is desirably provided with an access door 83, operated independently of the access door 45 to the main refrigerating compartment.

From the foregoing disclosure, it will be seen that I have provided a domestic refrigerator having a tenderizing compartment therein which may be independently maintained at a higher temperature, for a predetermined interval of time, than that of the main compartment, whereupon said temperature is automatically lowered to that of said main compartment for preserving the meat which, during the interval has been tenderized, while prevented from spoilage by the action of the desired band of ultra-violet radiations produced by the lamp 79, and thereby substantially restricted to between 2500 and 3000 Angstrom units.

Although it is desirable to maintain a definite control of the humidity in the compartment, as well as the temperature, in accordance with the teachings of my Patents Nos. 2,169,081 and 2,192,348, previously referred to, yet it has been found from experience that in domestic refrigerators of this character where the food or meat treating compartment is relatively small; that is, the food or meat being treated takes up a large proportion of the volume thereof, as when a normal cut of meat for family use is put in the relatively small compartment 50 of Figs. 7 and 8, a high humidity or one from about 80 to 97% is normally maintained, which is entirely satisfactory for accomplishing tenderization of the meat in three or four days, with the avoidance of any appreciable dehydration or other undesirable action on the same, thereby accomplishing the desirable results in connection with meat tenderization already described in said copending patents.

Although I have described preferred embodiments of my invention, it will be understood that further modifications may be made within the spirit and scope of the appended claims. For example, I may supply the evaporators with refrigerant from a single compressor-condenser unit and common expansion device to maintain the compartment 50 at a relatively high temperature and the compartment 41 at a lower temperature, as described and claimed in the copending application of L. B. M. Buchanan, Serial No. 15,003, filed April 6, 1935, now Patent No. 2,133,948, dated October 25, 1938, and owned by the assignee of the present application.

In using the arrangement of said Buchanan patent for a domestic refrigerator, in accordance with the present application, the evaporator 42 would be that for the lower temperature and the evaporator 52 would be that for the higher temperature, which evaporators would be in free communication with each other so that the pressure therein would always be substantially the same. These evaporators would be arranged with the connection between them and the supply of liquid refrigerant in such manner that such refrigerant flows into the evaporator 42 from the condenser 55, for example, in preference to the evaporator 52. This may be done, for example, by disposing the connection to the evaporator 42 at the point of division at a lower level than the connection to the evaporator 52.

When refrigeration is to be effected in the evaporator 42, liquid refrigerant is supplied only to said evaporator, the evaporator 52 remaining dry so that evaporation of refrigerant cannot take place therein. The superheating of the vapor in said evaporator 52 does not affect the low pressure of operation of the evaporator 42. When refrigeration is to be effected in the evaporator 52, the evaporator 42 is first substantially filled with liquid refrigerant, by reason of the arrangement giving it preference, and then the evaporator 52 is supplied with liquid refrigerant to effect evaporation therein. By filling the evaporator 42 with liquid refrigerant, condensation of vaporous refrigerant therein, which would otherwise be caused by the higher pressure effected by evaporization in the evaporator 52, is avoided.

It will therefore be seen that the difference between the temperature of the meat tenderizing compartment 50 and that of the main compartment 41, may be maintained; by entirely independent refrigerating means in the compartments; by a common compressor-condenser unit and separate evaporators in the compartments; or by having the refrigerating means in the compartment 41 only, relying on the heat transfer through the partition 51, which in this case would not be of particularly good insulation, to maintain the desired moderate temperature in the compartment 50.

This application is a continuation-in-part of my copending application Serial No. 734,620, filed July 11, 1934, and which matured into Patent No. 2,258,765, and of my now abandoned copending applications Serial Nos. 741,096 and 741,098, both filed August 23, 1934.

I claim:

1. In refrigeration apparatus, the combination of a cabinet, a porous partition for dividing the cabinet into two heat-insulated compartments, a heat-absorbing element disposed in one compartment to refrigerate the air therein and to cause a restricted circulation of refrigerated air through the porous partition to maintain the second compartment at a warmer refrigerated temperature, whereby dehydration of foodstuffs in the warmer compartment is inhibited, and ultra-violet radiating means disposed in the warmer compartment for preventing the growth of bacteria and molds, whereby foodstuffs are safely preserved in the warmer compartment.

2. In refrigeration apparatus, the combination of a food and liquid storage compartment, means for effecting the circulation of cold air in a vertical direction in the storage compartment, horizontal shelves disposed in said storage compartment for supporting articles of food and liquid and for dividing the storage compartment into a plurality of superposed sub-compartments, an irradiating device disposed in said storage compartment and comprising an elongated tube conforming substantially with the height of the storage compartment and having portions thereof disposed in each sub-compartment, said elongated tube being also disposed so that the vertical air currents in the storage compartment contact with the tube throughout substantially the entire length thereof, whereby foodstuffs in each sub-compartment are directly irradiated by light emitted from the tube and the air circulating in the food storage compartment is sterilized by passing over the tube throughout its entire length.

3. In refrigeration apparatus, the combination of a food and liquid storage compartment, means for effecting a circulation of cold air in a vertical direction in the storage compartment, horizontal shelves having openings therein for the circulation of air and disposed in said storage compartment for supporting articles of food and liquid, said shelves dividing the storage compartment into a plurality of superposed sub-compartments, and a radiating device disposed in said storage compartment and comprising an elongated tube having portions thereof disposed in a plurality of said sub-compartments, said elongated tube being so positioned as to effect direct irradiation of the foodstuffs in the respective sub-compartments as well as irradiation of the air circulating through the sub-compartment because of the passage of the air in the vicinity of the tube and in the direction of the major axis thereof.

4. In refrigeration apparatus, the combination of a food storage compartment, means for cooling the food storage compartment, means for dividing the food storage compartment into a plurality of sub-compartments, said dividing means being formed of material substantially impervious to the passage of ultra-violet radiations, and an ultra-violet radiating device comprising an elongated tube extending into all of said sub-compartments to effect direct sterilization of the foodstuffs in each sub-compartment.

5. In refrigeration apparatus, a cabinet comprising a refrigeration compartment, means for abstracting heat from said compartment, means for controlling the heat abstracting means so that its operation varies for a given desired temperature in accordance with the temperature of the ambient air, in order that said temperature will remain constant regardless of variations in said air, said means comprising an adjusting knob acting to bias a spring controlling a lever connected with a switch in the circuit to the source of power for said refrigerating means, whereby said circuit is open for a greater length of time during periods of relatively low ambient temperatures, than during periods of relatively high ambient temperatures, in order to compensate for the variation in load on said apparatus, and means for automatically turning said adjusting knob to decrease the temperature in said compartment after a predetermined period of time, said means comprising an electrical clock started on a desired time interval and having a moving element which closes a circuit at the end of said interval and operates a solenoid releasing a pawl to allow a spring acting on said knob to move it to decrease the bias in the lever-controlling spring and the temperature in said compartment to a desired extent.

6. In refrigeration apparatus, the combination of a food and liquid storage compartment, means for effecting the circulation of cold air in a vertical direction in the storage compartment, horizontal shelves disposed in said storage compartment for supporting articles of food and liquid and for dividing the storage compartment into a plurality of superposed sub-compartments, an irradiating device disposed in said storage compartment and comprising an elongated tube conforming substantially with the height of the storage compartment and having portions thereof disposed in each sub-compartment, said device being so constructed and operated, and its tube being formed of such glass, that a large proportion of its radiations lie in the band between 2530 and 2540 A. U., said elongated tube being also disposed so that the vertical air currents in the storage compartment contact with the tube throughout substantially the entire length thereof, whereby foodstuffs in each sub-compartment are directly irradiated by light emitted from the tube and the air circulating in the food storage compartment is sterilized by passing over the tube throughout its entire length.

7. In refrigeration apparatus, the combination of a food and liquid storage compartment, means for effecting a circulation of cold air in a vertical direction in the storage compartment, horizontal shelves having openings therein for the circulation of air and disposed in said storage compartment for supporting articles of food and liquid, said shelves dividing the storage compartment into a plurality of superposed sub-compartments, and a radiating device disposed in said storage compartment and comprising an elongated tube having portions thereof disposed in a plurality of said sub-compartments, said elongated tube being so positioned as to effect direct irradiation of the foodstuffs in the respective sub-compartments as well as irradiation of the air circulating through the sub-compartments because of the passage of the air in the vicinity of the tube and in the direction of the major axis thereof, said device being so constructed and operated, and its tube being formed of such glass, that a large proportion of its radiations lie in the band between 2530 and 2540 A. U.

8. In refrigeration apparatus, the combination of a food storage compartment, means for cooling the food storage compartment, means for dividing the food storage compartment into a plurality of sub-compartments, said dividing means being formed of material substantially impervious to the passage of ultra-violet radiations, and an ultra-violet radiating device comprising an elongated tube extending into all of said sub-compartments to effect direct sterilization of the foodstuffs in each sub-compartment, said device being so constructed, and its tube being formed of such glass, that a large proportion of its radiations lie in the band between 2530 and 2540 A. U.

9. In refrigeration apparatus, in combination, a cabinet, a porous odor-absorbing partition dividing said cabinet into two compartments, a heat-absorbing element disposed in one compartment to refrigerate the air therein and to cause a restricted circulation of refrigerated air through the porous partition to maintain the second compartment at a warmer refrigerated temperature, whereby dehydration of foodstuffs in the warmer compartment is inhibited, and ultra-violet radiating means disposed in the warmer compartment to prevent the growth of bacteria and molds, whereby foodstuffs are safely preserved and odors reduced in the warmer compartment.

ROBERT F. JAMES.

REFERENCES CITED

The following references are of record in the file of this patent:

UNITED STATES PATENTS

| Number | Name | Date |
|---|---|---|
| 1,185,597 | Eddy | May 30, 1916 |
| 1,787,209 | Muffly | Dec. 30, 1930 |
| 1,796,134 | Warner | Mar. 10, 1931 |
| 1,827,530 | Le Grand | Oct. 13, 1931 |
| 1,911,913 | Mayor | May 30, 1933 |
| 1,917,848 | Marden | July 11, 1933 |
| 1,980,971 | Campsie | Feb. 15, 1934 |
| 1,984,639 | Grant | Dec. 18, 1934 |
| 2,056,165 | Bronaugh | Oct. 6, 1936 |
| 2,068,212 | Whitman | Jan. 19, 1937 |
| 2,126,787 | LeBel | Aug. 16, 1938 |
| 2,133,948 | Buchanan | Oct. 25, 1938 |
| 2,145,196 | Biggs | Jan. 24, 1939 |
| 2,154,299 | Bixzer | Apr. 11, 1939 |
| 2,169,081 | James | Aug. 8, 1939 |
| 2,192,348 | James | Mar. 5, 1940 |
| 2,314,301 | Williams | Mar. 16, 1943 |

FOREIGN PATENTS

| Number | Country | Date |
|---|---|---|
| 12,836 | Great Britain | 1906 |
| 26,754 | Great Britain | 1897 |
| 325,824 | Great Britain | Feb. 24, 1930 |